United States Patent
Hofler et al.

(10) Patent No.: US 8,494,735 B2
(45) Date of Patent: Jul. 23, 2013

(54) METHOD FOR OPERATING THE TORQUE CONVERTER LOCK-UP CLUTCH IN A POWER TRANSMISSION OF A MOBILE MACHINE COMPRISING AT LEAST ONE HYDRAULICALLY ACTUATED LIFTING DEVICE

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 151 days.

(21) Appl. No.: 13/124,846

(22) PCT Filed: Sep. 30, 2009

(86) PCT No.: PCT/EP2009/062651
§ 371 (c)(1),
(2), (4) Date: Apr. 19, 2011

(87) PCT Pub. No.: WO2010/046214
PCT Pub. Date: Apr. 29, 2010

(65) Prior Publication Data
US 2011/0202244 A1      Aug. 18, 2011

(30) Foreign Application Priority Data
Oct. 23, 2008   (DE) .......................... 10 2008 043 106

(51) Int. Cl.
*F16H 59/36*   (2006.01)
*F16H 59/00*   (2006.01)
*F16H 45/02*   (2006.01)
*G06F 7/70*    (2006.01)
*B60W 10/02*   (2006.01)

(52) U.S. Cl.
USPC ................... 701/60; 701/50; 701/65; 701/67; 701/51; 477/169; 477/174; 477/176; 477/62

(58) Field of Classification Search
None
See application file for complete search history.

(56) References Cited

U.S. PATENT DOCUMENTS

| | | | |
|---|---|---|---|
| 3,985,046 | A | 10/1976 | Morris et al. |
| 4,246,997 | A | 1/1981 | Tarumizu |
| 4,640,394 | A | 2/1987 | Higashi et al. |
| 4,819,777 | A | 4/1989 | Yasue et al. |
| 4,835,694 | A | 5/1989 | Yamamoto et al. |
| 5,040,648 | A * | 8/1991 | Mitchell et al. ............. 192/3.58 |
| 5,505,267 | A * | 4/1996 | Orbach et al. ..................... 172/3 |
| 5,509,520 | A | 4/1996 | Evans et al. |
| 5,562,571 | A | 10/1996 | Maruyama et al. |

(Continued)

FOREIGN PATENT DOCUMENTS

| DE | 3 47 256 A1 | 7/1985 |
|---|---|---|
| DE | 35 17 381 A1 | 11/1985 |

(Continued)

*Primary Examiner* — Fadey Jabr
*Assistant Examiner* — Kevin P Mahne
(74) *Attorney, Agent, or Firm* — Davis & Bujold, PLLC

(57) ABSTRACT

A method of operating the torque converter lock-up clutch in a power transmission of a working machine comprising at least one hydraulically actuated lifting device. The torque converter lock-up clutch is actuated for disengagement when a predefined limit value for the position of the lifting hydraulic mechanism of the at least one lifting device is exceeded. When the position of the lifting hydraulic mechanism falls below a predefined limit value and when the turbine rotational speed exceeds a predefined threshold value, the torque converter lock-up clutch is reengaged.

4 Claims, 2 Drawing Sheets

U.S. PATENT DOCUMENTS

| | | | |
|---|---|---|---|
| 5,573,473 A | 11/1996 | Asayama et al. | |
| 5,609,547 A * | 3/1997 | Matsushita et al. | 477/110 |
| 5,621,643 A | 4/1997 | Nakagami et al. | |
| 5,681,238 A | 10/1997 | Minowa et al. | |
| 5,720,358 A | 2/1998 | Christensen et al. | |
| 5,976,055 A | 11/1999 | Sasaki | |
| 6,017,290 A | 1/2000 | Kinoshita et al. | |
| 6,042,507 A | 3/2000 | Genise et al. | |
| 6,099,435 A | 8/2000 | Halene et al. | |
| 6,181,020 B1 | 1/2001 | Uchida et al. | |
| 6,234,254 B1 | 5/2001 | Dietz et al. | |
| 6,306,061 B1 | 10/2001 | Inamura et al. | |
| 6,314,357 B1 | 11/2001 | Kon et al. | |
| 6,615,963 B2 | 9/2003 | Ono et al. | |
| 6,997,851 B2 | 2/2006 | Hofler | |
| 7,778,757 B2 | 8/2010 | Brattberg | |
| 8,306,704 B2 * | 11/2012 | Matsuyama | 701/50 |
| 2003/0045396 A1 * | 3/2003 | Carlson et al. | 477/107 |
| 2004/0188168 A1 | 9/2004 | Aumann | |
| 2004/0192505 A1 | 9/2004 | Leber et al. | |
| 2004/0214687 A1 * | 10/2004 | Morisawa et al. | 477/109 |
| 2007/0099757 A1 * | 5/2007 | Landes | 477/175 |
| 2007/0149354 A1 | 6/2007 | Ota et al. | |
| 2007/0150151 A1 * | 6/2007 | Brattberg | 701/51 |
| 2008/0040006 A1 * | 2/2008 | Sjogren et al. | 701/49 |
| 2008/0214348 A1 * | 9/2008 | Hasegawa et al. | 475/80 |
| 2008/0234906 A1 | 9/2008 | Warner | |
| 2008/0242502 A1 | 10/2008 | Lin | |
| 2008/0264051 A1 * | 10/2008 | Ericson et al. | 60/327 |
| 2009/0005944 A1 * | 1/2009 | Legner | 701/67 |
| 2009/0054206 A1 | 2/2009 | Tamba et al. | |
| 2009/0111655 A1 * | 4/2009 | Hatanaka | 477/218 |
| 2009/0247356 A1 * | 10/2009 | Hatanaka | 477/64 |
| 2010/0094492 A1 * | 4/2010 | Filla | 701/22 |
| 2010/0307881 A1 * | 12/2010 | Detrick et al. | 192/3.22 |
| 2011/0036651 A1 * | 2/2011 | Majkrzak | 180/53.4 |

FOREIGN PATENT DOCUMENTS

| | | |
|---|---|---|
| DE | 36 26 100 A1 | 2/1987 |
| DE | 37 12 498 A1 | 10/1987 |
| DE | 40 30 811 A1 | 4/1992 |
| DE | 44 27 359 A1 | 2/1995 |
| DE | 44 07 951 A1 | 9/1995 |
| DE | 195 21 458 A1 | 12/1995 |
| DE | 196 36 629 A1 | 3/1997 |
| DE | 198 20 047 A1 | 11/1998 |
| DE | 199 10 049 A1 | 9/1999 |
| DE | 199 25 414 A1 | 12/1999 |
| DE | 698 06 837 T2 | 4/2003 |
| DE | 698 20 922 T2 | 6/2004 |
| DE | 103 14 327 A1 | 10/2004 |
| DE | 103 14 334 A1 | 10/2004 |
| DE | 103 14 337 A1 | 10/2004 |
| DE | 600 08 957 T2 | 1/2005 |
| DE | 103 56 194 A1 | 7/2005 |
| DE | 60 2004 013 201 T2 | 7/2009 |
| EP | 0 907 043 A1 | 4/1999 |
| EP | 1 188 960 A2 | 3/2002 |
| EP | 1 801 294 A1 | 6/2007 |
| FR | 2 557 518 A1 | 7/1985 |
| WO | 2006/011832 A1 | 2/2006 |
| WO | 2006/017902 A1 | 2/2006 |

* cited by examiner

METHOD FOR OPERATING THE TORQUE CONVERTER LOCK-UP CLUTCH IN A POWER TRANSMISSION OF A MOBILE MACHINE COMPRISING AT LEAST ONE HYDRAULICALLY ACTUATED LIFTING DEVICE

This application is a National Stage completion of PCT/EP2009/062651 filed Sep. 30, 2009, which claims priority from German patent application serial no. 10 2008 043 106.0 filed Oct. 23, 2008.

FIELD OF THE INVENTION

The present invention relates to a method for operating the torque converter lock-up clutch, in a power transmission of a working machine, comprising at least one hydraulically actuated lifting device.

BACKGROUND OF THE INVENTION

In order to reduce the power loss in a hydrodynamic torque converter, according to the prior art, a torque converter lock-up clutch is implemented with power transmissions, through which the turbine wheel of the converter can be connected to the impeller. When the torque converter lock-up clutch is engaged, a loss-free drive connection exists between the drive motor and the transmission of the vehicle.

With previously known applications for working machines, such as dump trucks, graders and mobile cranes, engagement and disengagement of the torque converter lock-up clutch is dependent on the rotational speed of the turbine taking into account the characteristic curve of the converter. For this, a disengaged torque converter lock-up clutch is actuated for engagement when the turbine rotational speed exceeds a threshold value at which the turbine torque is the same for both the engaged and disengaged torque converter lock-up clutch. According to the prior art, an engaged torque converter lock-up clutch is actuated for disengagement when the turbine rotational speed falls below a threshold level at which the turbine torque is the same for both the engaged and disengaged torque converter lock-up clutch. These shifting points are determined by the difference of the rotational speeds of the turbine and impeller.

With working machines such as wheeled loaders, forklifts, backhoe-loaders, telehandlers, etc., having hydraulically actuated lifting devices, which are driven in short working cycles and thereby resulting in a distribution of the performance of the internal combustion engine between the working hydraulics and the drive mechanism, the control of the torque converter lock-up clutch by means of the turbine rotational speed has proven to be disadvantageous. In particular, in the case of the load cycle, for example with a front-end or back-hoe loader, it is possible with this procedure that the engagement point of the torque converter lock-up clutch is reached precisely when the driver of the vehicle wants to slow down in front of a truck, thus resulting in the vehicle accelerating in a disadvantageous manner as a result of the engagement of the torque converter lock-up clutch. Furthermore, this procedure can also lead to there being too little power for the hydraulic mechanism, as a result of the low rotational speed of the engine, when the hydraulic mechanism is actuated while the torque converter lock-up clutch is engaged. The same disadvantage also occurs with fork-lifts when actuating the lifting device.

In a typical load cycle of a wheeled loader, the hydraulic mechanism is activated for lowering the shovel into the load and for raising the shovel when approaching a truck. A high rotational speed of the motor is necessary for this in order to provide the working hydraulic with enough power. With an engaged torque converter lock-up clutch, the motor is at a low rotational speed, wherein too little power is made available for the working hydraulic, in comparison to the operating conditions with a disengaged torque converter lock-up clutch.

It is known from the prior art that with wheeled loaders comprising a torque converter lock-up clutch, to prevent engaging the torque converter lock-up clutch in the lower gears.

Accordingly, an optimal usage of the torque converter lock-up clutch in working machines having short working cycles at low driving speeds in order to save fuel is not possible.

From DE 33 47 256 C2 a control device for a torque converter lock-up clutch of a hydrodynamic torque converter in the drive train of a towing vehicle, in particular a tractor for agricultural use having an internal combustion engine as a power source, a shifting clutch and a shifting transmission is known, wherein an auxiliary input shaft is provided, which rotates directly proportionally to the crankshaft of the driving motor, for driving working devices.

The torque converter lock-up clutch is automatically engaged, when a upper shifting rotational speed has been reached, and disengaged, at a lower shifting rotational speed, wherein the torque converter lock-up clutch is engaged and disengaged by means of a circuit provided for this purpose having inputs for the rotational speed of the turbine wheel of the torque converter and the rotational speed of the power-take-off shaft, which forms a control signal for the control valve of the torque converter, based on predefined values for the upper rotation speed and the lower rotational speed as well as the minimum working rotational speed and the maximum working rotational speed of the engaged power-take-off shaft.

As a result, a more effective power-take-off shaft, or a power-take off auxiliary drive mode, should be guaranteed with lower power loss of the torque converter.

SUMMARY OF THE INVENTION

The present invention has the objective of providing a method for operating the torque converter lock-up clutch of a power transmission of a working machine comprising at least one hydraulically actuated lifting device, by means of which, when using the lifting hydraulic mechanism of the lifting device, sufficient power is made available, wherein the power loss to the converter is kept to a minimum to the greatest extent possible.

BRIEF DESCRIPTION OF THE DRAWING

The invention will now be described, by way of example, with reference to.

DETAILED DESCRIPTION OF THE PREFERRED EMBODIMENTS

Figure 1:
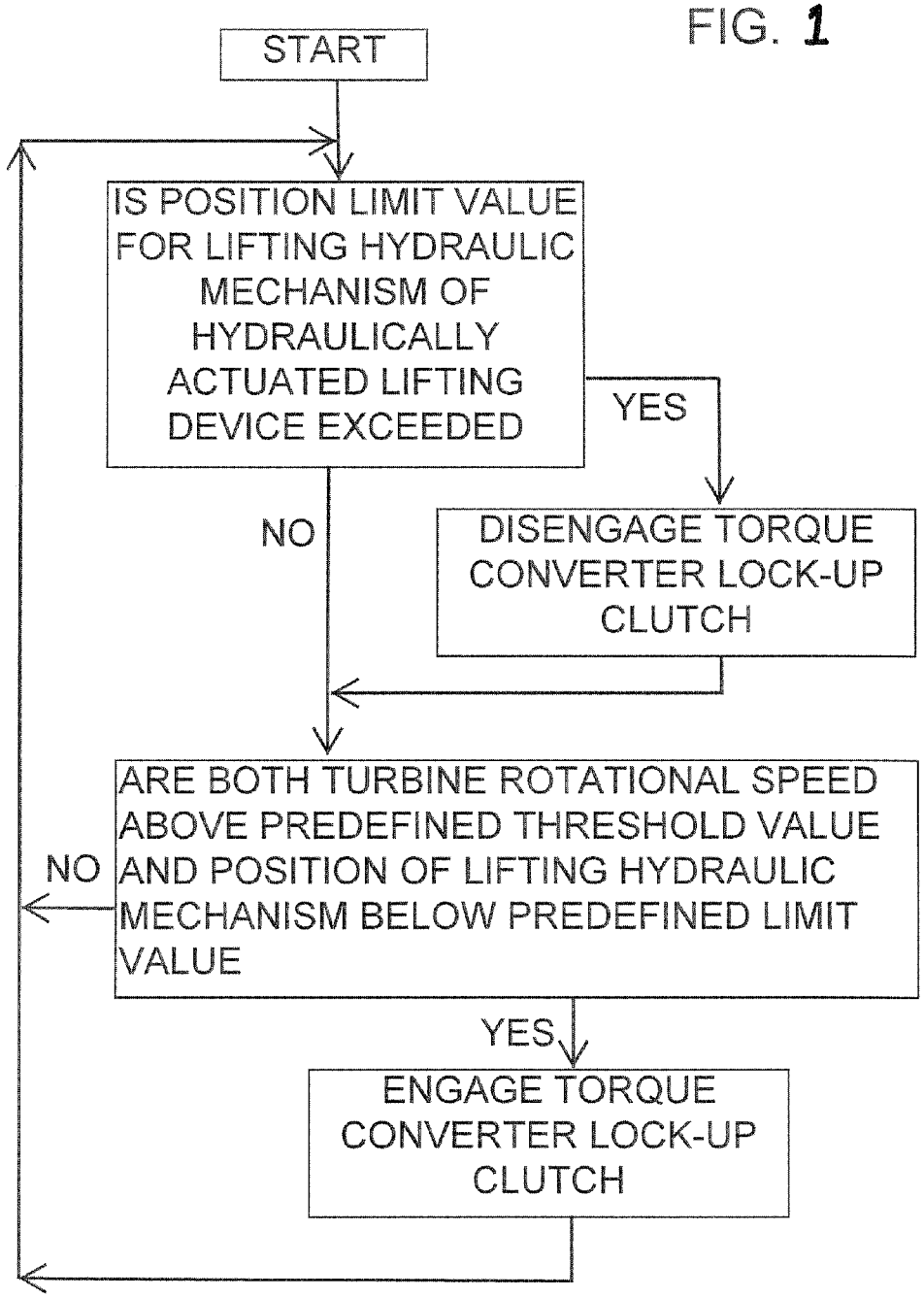
FIG. 1 is a flow diagram depicting one embodiment of the present method.
Figure 2:
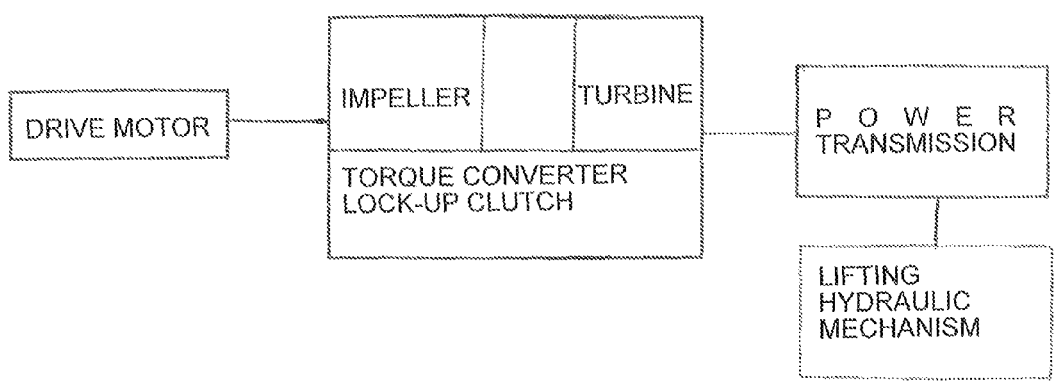
FIG. 2 is a drawing diagrammatically showing the various components for the present method.

With reference to FIGS. 1 and 2, a detail description concerning the present invention will now be provided. In accordance with this, a method for operating the torque converter lock-up clutch is proposed in the framework of which the torque converter lock-up clutch is actuated for disengagement, when a predefined limit value for the position of the lifting hydraulic mechanism of the at least one hydraulically actuated lifting device has been exceeded, whereas, when the position of the lifting hydraulic mechanism falls below a predefined limit value and when the turbine rotational speed exceeds a predefined threshold value, the torque converter lock-up clutch is re-engaged.

Preferably, when the position of the lifting hydraulic mechanism falls below a predefined limit value, the torque converter lock-up clutch is re-engaged when the turbine rotational speed exceeds a threshold value at which the turbine torque is the same for both an engaged and a disengaged torque converter lock-up clutch.

For example, with a wheeled loader, the level of the shovel, and with a forklift, the level of the lifting mechanism, can serve as the position of the lifting hydraulic mechanism, according to the invention. Exceeding of a predefined value for the position of the lifting hydraulic mechanism may be determined by means of a position sensor, wherein a rotation angle sensor on a joint or a range sensor, on the hydraulic cylinder of the lifting hydraulic mechanism, can serve as the position sensor.

In order to maintain the motor braking effect when driving downhill with an engaged torque converter lock-up clutch, according to a further embodiment of the invention, if the speed of the vehicle falls below a threshold value or if the transmission input torque exceeds a predefined threshold value, the torque converter lock-up clutch can be disengaged only when the predefined limit value for the position of the lifting hydraulic mechanism has been exceeded.

Preferably, the input signals regarding the position of the lifting hydraulic mechanism, the turbine and the motor rotational speeds as well as the motor torque, are evaluated by means of transmission electronics which control the engaging and disengaging of the torque converter lock-up clutch.

The invention claimed is:

1. A method of operating a hydrodynamic torque converter lock-up clutch in a power transmission of a working machine comprising a lifting hydraulic mechanism of at least one hydraulically actuated lifting device, and the torque converter having an input and an output, the method comprising the steps of:
   using a position sensor, coupled to transmission electronics, for determining a position of the lifting hydraulic mechanism;
   comparing, via the transmission electronics, the determined position of the lifting hydraulic mechanism to a predefined limit value for the position of the lifting hydraulic mechanism;
   using a speed sensor, coupled to the transmission electronics, for determining a rotational speed of a turbine of the torque converter;
   comparing, via the transmission electronics, the rotational speed of the turbine to a predefined threshold value;
   disengaging, via the transmission electronics, the hydrodynamic torque converter lock-up clutch on condition that the predefined limit value for the position of the lifting hydraulic mechanism for the at least one hydraulically actuated lifting device is exceeded so as to provide a drive connection, between the input and the output, which experiences hydraulic power loss,
   engaging, via the transmission electronics, the hydrodynamic torque converter lock-up clutch, on condition that both the turbine rotational speed exceeds the predefined threshold value and the position of the lifting hydraulic mechanism falls below the predefined limit value, to achieve a loss free drive connection between the input and the output; and
   when driving downhill with the hydrodynamic torque converter lock-up clutch engaged and, in an event of exceeding the predefined limit value for the position of the lifting hydraulic mechanism, only disengaging the hydrodynamic torque converter lock-up clutch on condition that one of a speed of the vehicle falls below a threshold value and a transmission input torque exceeds a predefined threshold value.

2. The method of operating the hydrodynamic torque converter lock-up clutch in the power transmission according to claim 1, further comprising the step of when the position of the at least one hydraulically actuated lifting device falls below the predefined limit value, engaging the hydrodynamic torque converter lock-up clutch when the turbine rotational speed exceeds the predefined threshold value where the turbine torque is the same for both the engaged and the disengaged hydrodynamic torque converter lock-up clutch.

3. A method of operating a hydrodynamic torque converter lock-up clutch of a hydrodynamic torque converter in a power transmission of a working machine, the hydrodynamic torque converter comprising an impeller, a turbine and the hydrodynamic torque converter lock-up clutch, and the working machine comprising a lifting hydraulic mechanism of at least one hydraulically actuated lifting device, the method comprising the steps of:
   using a position sensor, coupled to transmission electronics, for determining a position of the lifting hydraulic mechanism;
   comparing, via the transmission electronics, the determined position of the lifting hydraulic mechanism to a predefined limit value for the position of the lifting hydraulic mechanism;
   using a speed sensor, coupled to the transmission electronics, for determining a rotational speed of a turbine of the torque converter;
   comparing, via the transmission electronics, the rotational speed of the turbine to a predefined threshold value;
   disengaging the hydrodynamic torque converter lock-up clutch, via transmission electronics, on condition that the predefined limit value for the position of the lifting hydraulic mechanism for the at least one hydraulically actuated lifting device is exceeded so as to provide a drive connection, between the impeller and the turbine, which experiences hydraulic power loss, and
   engaging the hydrodynamic torque converter lock-up clutch, via the transmission electronics, to achieve a loss free drive connection between the impeller and the turbine on condition that the turbine rotational speed exceeds the predefined threshold value and if the position of the lifting hydraulic mechanism falls below the predefined limit value;
   when the position of the at least one hydraulically actuated lifting device falls below the predefined limit value, engaging the hydrodynamic torque converter lock-up clutch, via transmission electronics, to achieve a loss free drive connection between the impeller and the turbine on condition that the turbine rotational speed exceeds the predefined threshold; and
   when driving downhill with the hydrodynamic torque converter lock-up clutch engaged and in an event of exceeding the predefined limit value for the position of the lifting hydraulic mechanism, only disengaging the hydrodynamic torque converter lock-up clutch on condition that one of a speed of the vehicle falls below a threshold value and a transmission input torque exceeds a predefined threshold value.

4. A method of operating a hydrodynamic torque converter lock-up clutch of a hydrodynamic torque converter in a power transmission of a working machine, the hydrodynamic torque converter comprising an impeller, a turbine and the hydrodynamic torque converter lock-up clutch, and the working machine comprising a lifting hydraulic mechanism of at least one hydraulically actuated lifting device, the method comprising the steps of:

using a position sensor, coupled to transmission electronics, for determining a position of the lifting hydraulic mechanism;

comparing, via the transmission electronics, the determined position of the lifting hydraulic mechanism to a predefined limit value for the position of the lifting hydraulic mechanism;

using a speed sensor, coupled to the transmission electronics, for determining a rotational speed of a turbine of the torque converter;

comparing, via the transmission electronics, the rotational speed of the turbine to a predefined threshold value;

disengaging the hydrodynamic torque converter lock-up clutch, via transmission electronics, on condition that the predefined limit value for the position of the lifting hydraulic mechanism for the at least one hydraulically actuated lifting device is exceeded so as to provide a drive connection, between the impeller and the turbine, which experiences hydraulic power loss, and engaging the hydrodynamic torque converter lock-up clutch, via the transmission electronics, to achieve a loss free drive connection between the impeller and the turbine on condition that the turbine rotational speed exceeds the predefined threshold value and if the position of the lifting hydraulic mechanism falls below the predefined limit value;

when the position of the at least one hydraulically actuated lifting device falls below the predefined limit value, engaging the hydrodynamic torque converter lock-up clutch, via transmission electronics, to achieve a loss free drive connection between the impeller and the turbine on condition that the turbine rotational speed exceeds the predefined threshold;

when driving downhill with the hydrodynamic torque converter lock-up clutch engaged and in an event of exceeding the predefined limit value for the position of the lifting hydraulic mechanism, only disengaging the hydrodynamic torque converter lock-up clutch on condition that one of a speed of the vehicle falls below a threshold value and a transmission input torque exceeds a predefined threshold value; and controlling engagement and disengagement of the hydrodynamic torque converter lock-up clutch via the transmission electronics, which evaluates at least one input signal indicating the position of the lifting hydraulic mechanism, the turbine rotational speed and a motor rotational speed and a motor torque.

* * * * *